United States Patent
Rhodes

(10) Patent No.: US 7,207,733 B2
(45) Date of Patent: Apr. 24, 2007

(54) PHOTOGRAPHIC DEVELOPER EFFLUENT TRANSFER STATION AND DRAIN WASH

(75) Inventor: Curtis Rhodes, Albuquerque, NM (US)

(73) Assignee: Academy Corporation, Albuquerque, NM (US)

( * ) Notice: Subject to any disclaimer, the term of this patent is extended or adjusted under 35 U.S.C. 154(b) by 78 days.

(21) Appl. No.: 10/913,232

(22) Filed: Aug. 5, 2004

(65) Prior Publication Data

US 2005/0058448 A1    Mar. 17, 2005

Related U.S. Application Data

(60) Provisional application No. 60/503,559, filed on Sep. 16, 2003.

(51) Int. Cl.
*G03D 3/02* (2006.01)

(52) U.S. Cl. ..................................... 396/626

(58) Field of Classification Search ............. None
See application file for complete search history.

(56) References Cited

U.S. PATENT DOCUMENTS

| | | | |
|---|---|---|---|
| 3,626,835 A | 12/1971 | Buechner |
| 3,801,077 A | 4/1974 | Pearson |
| 4,200,607 A | 4/1980 | Suzuki |
| 4,572,230 A | 2/1986 | Mirabile |
| 4,650,308 A | 3/1987 | Burbury |
| 4,735,728 A | 4/1988 | Wemhoff |
| 4,911,832 A | 3/1990 | Miller et al. |
| 5,365,299 A | 11/1994 | Desai |
| 5,446,516 A | 8/1995 | Burbury et al. |
| 5,489,961 A | 2/1996 | Burbury et al. |
| 5,502,534 A | 3/1996 | Lynch et al. |
| 5,776,091 A | 7/1998 | Brugger et al. |
| 5,921,207 A | 7/1999 | DiSalvo et al. |
| 5,975,096 A | 11/1999 | Dunn |
| 5,983,919 A | 11/1999 | Ottinger et al. |
| 6,110,360 A | 8/2000 | Hart, Jr. |
| 6,146,136 A | 11/2000 | Tenniswood |
| 2002/0028501 A1 | 3/2002 | McMinn, Jr. |
| 2002/0076222 A1 | 6/2002 | Freidhoff et al. |
| 2003/0012574 A1 | 1/2003 | Wildman et al. |

FOREIGN PATENT DOCUMENTS

| JP | 62106462 | * | 5/1987 |
|---|---|---|---|
| JP | 62106463 | * | 5/1987 |

* cited by examiner

*Primary Examiner*—D. Rutledge
(74) *Attorney, Agent, or Firm*—Peacock Myers, P.C.; Deborah A. Peacock; Rod D. Baker

(57) ABSTRACT

An apparatus for transferring effluent from photograph development systems, especially highly automated, high-volume developer systems. A silver-recovery system discharges an iron-rich solution into a tank. Developer fluid and fixer solution is mixed with the iron-rich solution in the tank to buffer its pH. A float in the tank activates a switch located outside the tank to actuate a pump for evacuating the mixed effluent from the tank for disposal. Water may be mixed under pressure with the pumped effluent to reduce clogging in effluent drainage lines due to precipitate and other and build-ups from effluent.

13 Claims, 3 Drawing Sheets

PHOTOGRAPHIC DEVELOPER EFFLUENT TRANSFER STATION AND DRAIN WASH

CROSS-REFERENCE TO RELATED APPLICATIONS

This application claims the benefit of the filing of U.S. Provisional Patent Application Ser. No. 60/503,559, entitled Effluent Transfer Station and Drain Wash, filed on Sep. 16, 2003, and the specification thereof is incorporated herein by reference.

BACKGROUND OF THE INVENTION

1. Field of the Invention (Technical Field)

The present invention relates to systems for recovering ionic silver from effluent, especially effluent from conventional photographic film developing, and pertains specifically to an effluent transfer apparatus for flushing residues from system plumbing.

2. Background Art

It is known that the development of conventional photographic film results in the production of fluids containing valuable quantities of the precious metal silver. A variety of known methods and systems are used to recover silver from such fluid by-products. Typically, photographic by-product solutions are processed through a special canister where silver ions in solution are exchanged for iron ions. Silver thus can be recovered subsequently from the canister device (such devices are known in the art). The resulting fluid discharge is depleted of silver, but rich in iron. The iron-rich solution ordinarily is composed of bleach fix and stabilizers, which are mixed with developer solution to neutralize solution pH. The solution commonly is stored in an effluent tank until it is disposed down a hose for discharge into a drain for disposal.

A problem is that the discharged effluent is prone to clog the drainage line, especially as residue accumulates on the walls of drain lines. This problem is particularly acute in modern, technically automated development systems; automatic development systems are increasingly efficient to use reduced quantities of water, resulting in heavier sludge-like effluents. Plus, many automated systems not only develop and print photographs; they also cut, within the machine, the photographic paper. As a result, small paper trimmings and offal find their way into the effluent stream, increasing its density and proclivity to cause drain clogs. Against this background, the present invention was developed.

SUMMARY OF THE INVENTION (DISCLOSURE OF THE INVENTION)

The invention is an apparatus (and corresponding method) comprising a self-cleaning effluent transfer station for use in the photographic development industry. A tank holds system by-product solution mixed with developer solution, and when the effluent level in the tank reaches a selected height, a pump is actuated to evacuate solution from the tank. After being pumped from the tank, the mixed solution can be combined and mixed with fresh water, and forcibly discharged through the ultimate drain line, thus flushing the drain line and reducing undesirable residue build-up in the drain lines.

A primary object of the present invention is to provide an effluent transfer apparatus, for use in the photograph development industry, which requires considerably less maintenance than known transfer stations and techniques, and which in its preferred embodiment significantly reduces clogging in transfer station drain lines.

There is provided according to the invention an apparatus for transferring effluent from a photographic development system, the system discharging a waste developer solution and a by-product solution from a silver recovery device, the apparatus comprising: a tank; an inlet for introducing the waste developer solution into the tank; a canister discharge inlet for introducing the by-product solution into the tank for mixing with the developer solution, the mixture comprising an effluent the fluid level of which rises and falls within the tank; a pump for evacuating the effluent from the tank to a drain line; a control switch outside the tank and in communication with the pump; and a float within the tank, floatable upon the effluent at the fluid level, in operative connection with the control switch. The preferred embodiment further includes the optional but preferable features of a water feed line for supplying water to the drain line; and a water control valve, in communication with the control switch, for controlling water flow through the water feed line.

According to the preferred embodiment, the float signals the control switch to start the pump to begin evacuating the effluent when the fluid level rises to a first predetermined level in the tank, and the float signals the control switch to stop the pump when the fluid level falls to a second predetermined level in the tank. Preferably, the control switch opens the water control valve to start water flow (preferably under pressure) to the drain line while effluent is evacuating through the drain line, and the control switch closes the water control valve to stop water flow to the drain line when no effluent is evacuating through the drain line.

Preferably, the waste developer solution inlet is disposed in a side of the tank, and the effluent fluid level is maintained at or about the height of the developer solution inlet. There preferably is a tube means (such as a rigid PVC pipe) inside the tank, connected to the canister discharge inlet, for introducing the iron-rich silver-recovery by-product solution below the effluent fluid level. Because the effluent to be transferred may be very dense and somewhat viscous, the pump should have flexible impellers.

The first predetermined level mentioned above is approximately at the height of the waste developer solution inlet, and the float is movable up or down through a distance of between approximately 8" and approximately 10", so that the first predetermined level and the second predetermined level are separated by approximately 9"±1".

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
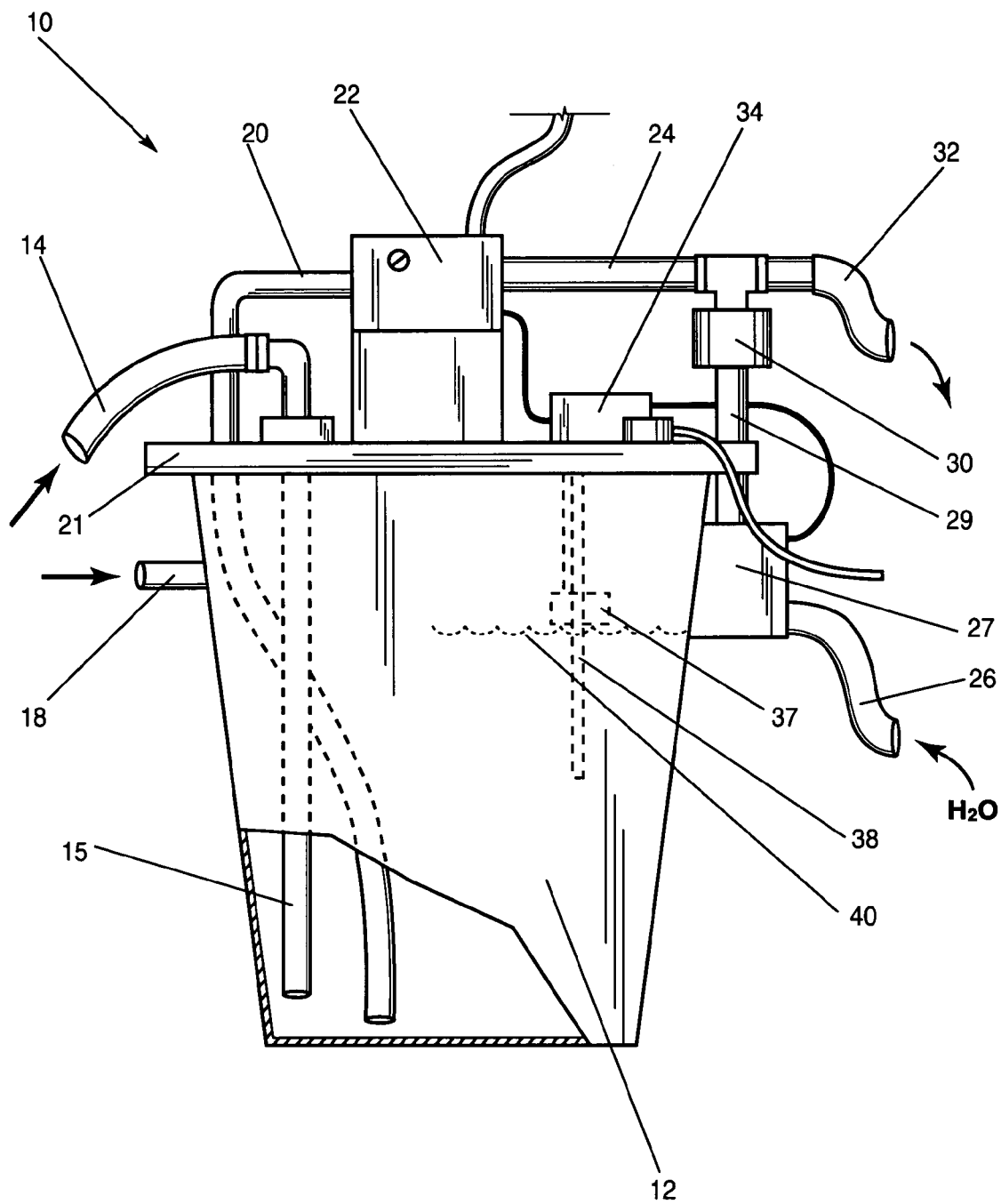
FIG. 1 is a side partial sectional view of the apparatus of the invention.

DESCRIPTION OF THE PREFERRED EMBODIMENTS BEST MODES FOR CARRYING OUT THE INVENTION

The present invention relates to an apparatus for providing a self-cleaning effluent transfer station, particularly a transfer station used by the photographic processing industry. The apparatus according to the invention is useable in combination with a solution neutralizer tank, can be used in known containment trays, and uses municipal water to rinse discharge lines to sewer.

According to the invention, there is provided an apparatus that easily pumps photographic effluent mixes that are slurry-like, and which tend to deposit tar-like and other residues in drainage lines. The apparatus provides controlled bursts of water to keep discharge plumbing, particularly effluent discharge hoses, free and clear of clogs. The inventive apparatus is particularly useful in connection with efficient development systems which generate highly concentrated, comparatively dense, effluent streams. Recent development systems generate waste streams having considerably thicker chemistry, due to increased concentrations of salts and elevated pH levels; current systems may produce effluents 30% to 40% higher in density than systems of even a few years ago.

Reference is made to the drawing figures. The invention operates with a transfer station 10 having a neutralizer tank 12. Neutralizer tank 12 receives and holds effluent solutions received from a silver recovery canister (not shown) known in the art. In one example of the invention, the tank has a capacity of approximately 3.5 gallons (U.S.). It will be understood, however, that the apparatus of the invention may be manufactured to any suitably practical size. The apparatus may be adapted in size to correspond to the effluent discharges to be managed.

Silver recovery canisters discharge solutions high in iron. The tank 12 is crafted from corrosion-resistant material, such as, by way of example only, polyethylene or stainless steel. The transfer station tank has a sealing lid 21 to enclose its interior. The lid 21 also mounts certain elements of the apparatus of the invention, as described below.

Iron-rich recovery by-product solution from the silver-recovery canister is discharged into the neutralizer tank 12 via the canister discharge inlet 14. The canister discharge inlet 14 has a tube 15 extending downward into the tank 12, so that the silver recovery by-product solution is discharged below the surface of the fluid in the tank. Thus, a feature of the apparatus is a tube means, e.g., a length of rigid PVC pipe 15, for introducing the by-product solution proximate to the bottom of the tank 12 below the level of effluent standing in the tank, regardless of the effluent level. Introducing the iron-rich by-product solution below the effluent surface eliminates contact between ambient air and undiluted by-product solution, thus minimizing undesirable oxidation of the by-product solution. A waste developer-fixer solution also is introduced through developer inlet 18 into the tank 12. The developer inlet preferably is in the side of the tank 12 a distance below the lid 21 as seen in FIG. 1.

An object of the invention is to provide an effluent transfer station in which the effluent is mixed to improve its acidity (pH) level prior to discharge to drain. The by-product received from a silver-recovery canister typically has acidity in the vicinity of pH 6.5 to pH 7.0. The developer solution emitted from a typical developer system is approximately pH 8.0 to pH 10.0, while the fixer is about pH 5.5. The invention mixes developer solution with the canister by-product solution, so that the developer can buffer the by-product, resulting in a mixed effluent having a pH of approximately 7.0 to 7.5.

Accordingly, the mixed effluent temporarily stored in the tank 12 consists partially of developer solution introduced into the tank 12 via the developer inlet 18. By mixing the comparatively harsh iron-bearing by-product solution with cast-off developer, the by-product solution is diluted in the tank 12. Preferably, a bleach fix also is mixed into the developer solution, so that the mixing of the developer-bleach solution effectively neutralizes the acidity of the mixture in the tank 12. The mixed effluent, i.e. the mixture of recovery by-product solution with the developer-bleach solution, is temporarily retained in the tank 12 until discharged out of the tank via the outlet tube 20.

A sample port 38 preferably is provided in the tank 12 to permit sampling of the chemistry of contained effluent therein.

The outlet tube 20 is connected to the inlet of an electrically powered, self-priming, fluid pump 22. The mixed solution is pumped, by the action of pump 22, so to be evacuated from inside the tank 12 to the pump discharge line 24. The pump 22 is, for example, a 1.5 amp self-priming pump. The pump 22 preferably has flexible impellers to pump the denser effluents characteristic of modem development systems. A flexible impeller pump suitable to a preferred embodiment of the invention is the JABSCO® brand pump, model number 12310-0001, available from ITT Industries (Jabsco US), of Foothill Ranch, Calif., USA.

Figure 2:
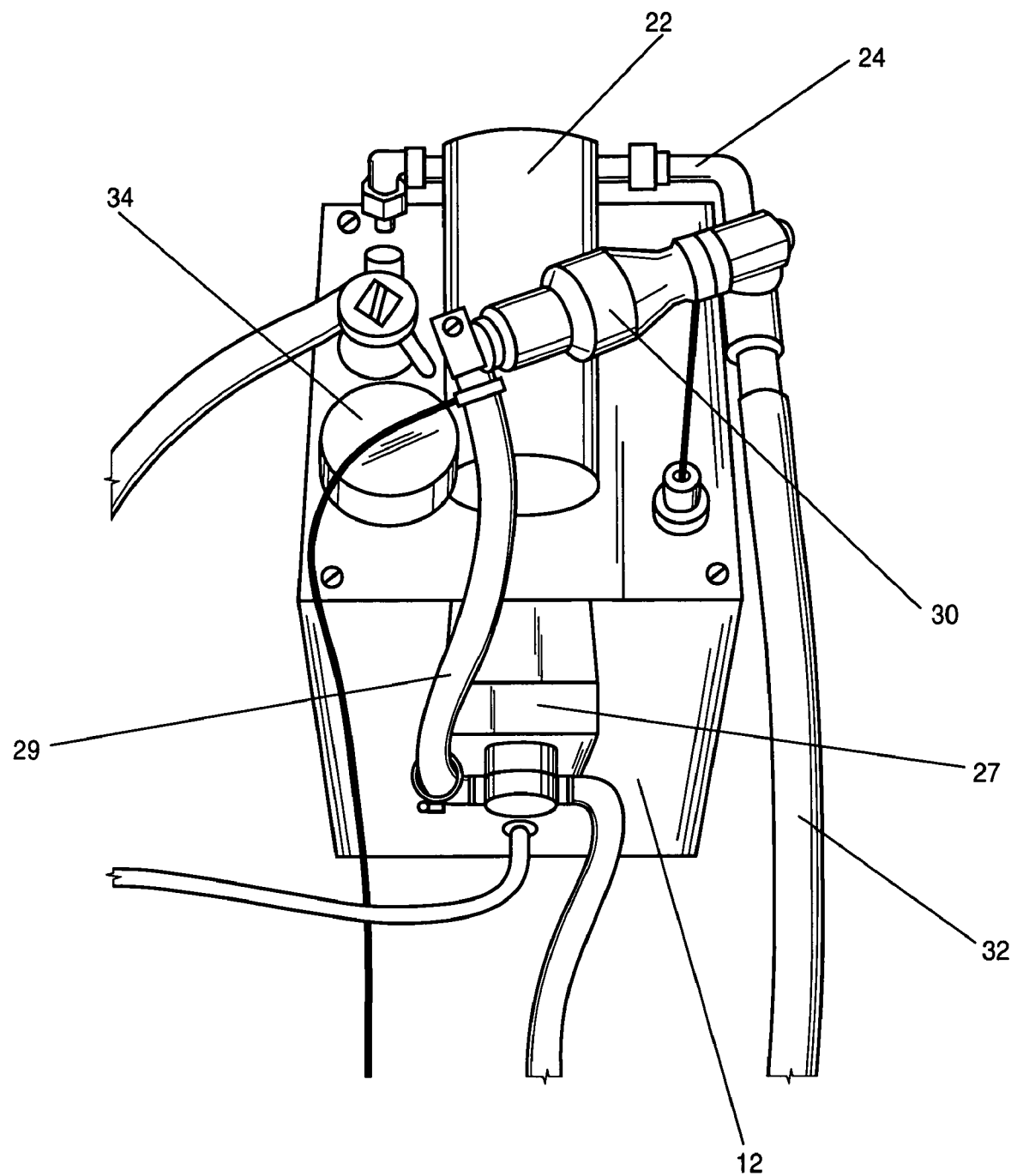
FIG. 2 is an enlarged top perspective view of a portion of the apparatus seen in FIG. 1, showing the pump, backflow prevention valve, water control valve, float control, and associated fluid-conducting lines and tubes.
Figure 3:
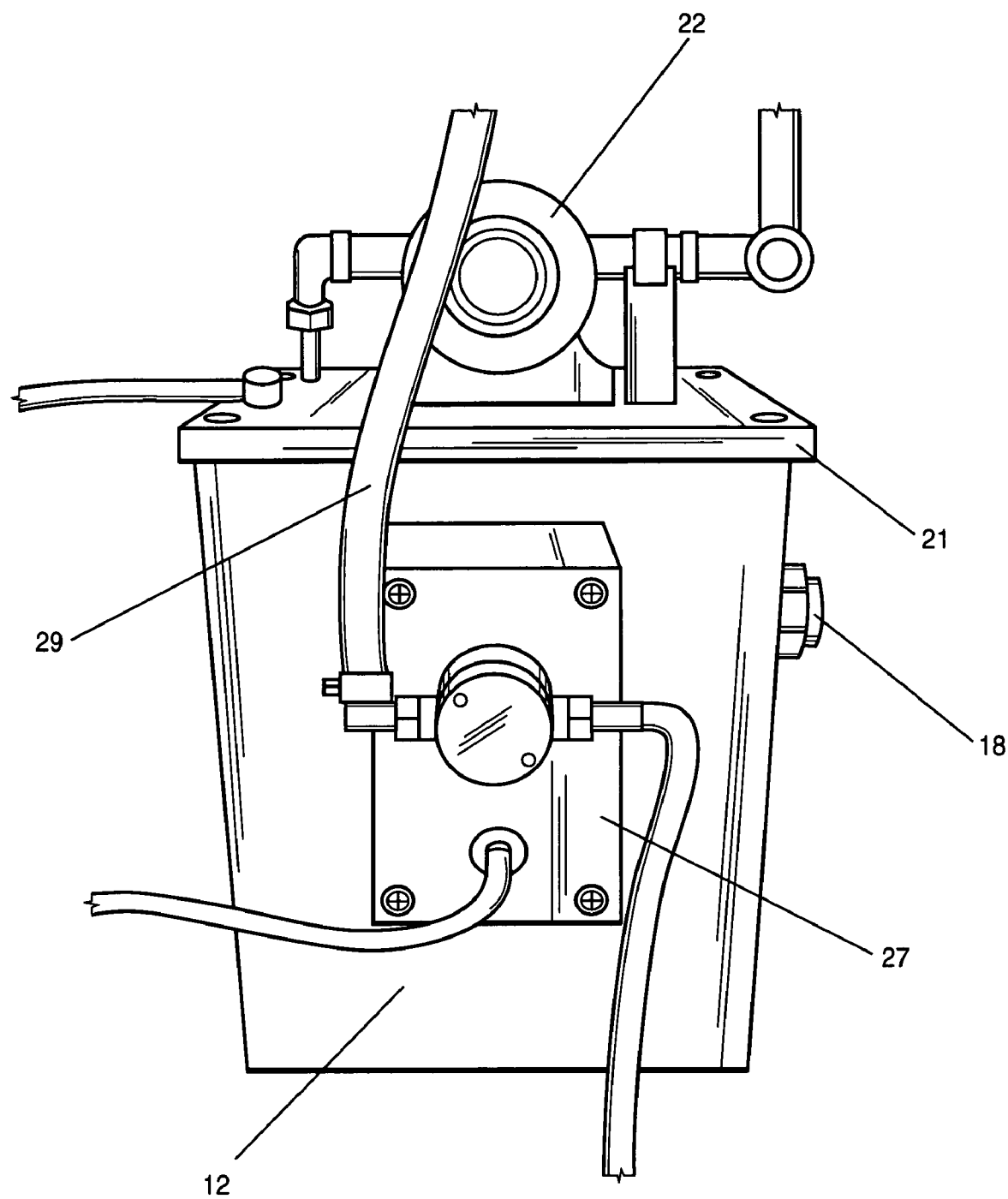
FIG. 3 is an enlarged side view of the portion of the inventive apparatus seen in FIG. 2.

A very preferable, but not critical, added feature of the invention is realized by importing clean water, such as from a municipal source, to the apparatus via the clean water feed line 26, as seen in FIGS. 1–3. Clean water is supplied under pressure to the water control valve 27 mounted upon the tank 12. When the water control valve 27 is open, water flows through valve outlet line 29 to the backflow prevention valve 30. Backflow prevention valve 30 prevents water from flowing backward in outlet line 29 toward the feed line 26. The prevention valve 30 thus prevents a reverse flow that otherwise could contaminate the water source and/or damage water control valve 27.

Outlet line 29 joins to the pump discharge line 24, as with an ordinary T-fitting or the like. Water flowing out of the backflow prevention valve 30 thus is combined with mixed effluent flowing out of the pump 22 through the pump discharge line 24. The combined fluids are then discharged to drain, for example a floor drain, via the drain line 32.

Continued reference is made to FIGS. 1–3. An advantage of the invention is provided by the operation of the float control switch 34. Float control switch 34 is an electronic signaling component of conventional off-the-shelf construction that is in electrical communication with both the pump 22 and the water control valve 27. A buoyant float 37 is free to travel vertically up and down on an inert guide rod 38 according to the fluid level 40 of the mixed effluent contained in tank 12. Guide rod 38 is inert to the mixed solution, and thus advantageously is resistant to the adverse chemistry inside the tank 12. The float 37 also is inert to the effluent, but is in mechanical communication with the control switch 34, so that the float control senses the fluid level 40 of the mixed solution in the tank 12. In the preferred embodiment, the float 37 has about eight to ten inches of travel up and down on the rod 38. The extended range of travel permits the actuation of the control switch 34 to be regulated to minimize frequency of pumping operation while yet optimizing overall apparatus performance.

The float 37 is mechanically operatively linked to the float control 24 (as by a rod linkage), and the mechanical linkage interacts magnetically and/or electrically with the control 24 at the location of the control. The introduction of any electrical current to the interior of the tank 12 thus is eliminated.

Control switch 34 advantageously is located outside the tank 12, preferably on the lid 21, protected from the harsh chemistry within the tank 12. Systems which place electrical components, including switches, inside the effluent tank are thus distinguished. In the present invention, no electrical components are located inside the tank, thus preventing their fouling or malfunction from harsh effluent chemistry. The control switch 34 senses the fluid level 40, and is pre-programmed to signal the pump 22 and the water control valve 27, when the fluid rises to a predetermined level in the tank 12.

As suggested from FIG. 1, the float 37 is movably situated on the rod 38 so to activate the pump 22 when the fluid level 40 is at a predetermined level, which may be approximately at the height of the developer inlet 18. Thus, the fluid level preferably is regulated to keep the inlet 18 at or about (either modestly above or below) the maximum fluid level in the tank 12. Similarly, when the fluid level of effluent mixture in the tank falls to a second predetermined level, the float signals the control switch 34 to stop the pump 22 to cease the evacuation of the tank.

The control switch 34 also can be connected to a switch controlling the flow of solution through the canister input 14, so that such flow is interrupted in the event of an imminent accidental overflow due to a failure elsewhere in the system, for example the pump 22.

The function of the invention, while generally apparent from the foregoing, is now described. By-product solution (from which most silver has been removed) is conveyed into the tank 12 through the canister discharge inlet 14 and rigid tube 15. Also, waste developer solution is dumped into the interior of the tank 12 via the developer inlet 18. The volume of developer is less than the volume of by-product solution, but the former significantly dilutes the latter; the developer solution also may contain a pH-neutralizer, such as bleach. The developer and by-product solutions mix inside the tank, and the level of the mixed effluent rises in the tank. The fluid level 40 is sensed and monitored by the float 37 which floats on the mixture and communicates to the control switch 34. When the mixed solution obtains a pre-determined level, the control switch 34 signals the pump 22 and the water control valve 27 to start the pump and open the control valve. The pump 22 evacuates mixed effluent from the tank 12 through the outlet tube 20 and the discharge line 24, while the pressurized line 26 supplies fresh water through the control valve 27 and the backflow check valve 30. The mixed solution and the clean water combine in the vicinity of the junction of the outlet line 29 and discharge line 24. The discharge line 32 thus is flushed out with a burst of high-velocity, diluted effluent (bearing precipitated iron). The flow out the drain line 32 continues until the fluid level 40 in the tank 12 recedes to a predetermined minimum, at which time the float 37 and control switch 34 signals the pump 22 to turn off, and the water control valve 27 to close.

The water mixed with the slurry-like mixed solution dilutes the combined flow to assure that the final effluent flow past a conventional trap (not shown) somewhere along the drain line 32. The pumped effluent scrubs the interior walls of the drain line 32. Further, the float control can be set to regulate a low fluid level 40, so that the tank is maintained mostly empty, if desired. Also, an overflow alarm (not shown) can be connected to the control switch 34, so that if the pump 22 fails, operators can be notified before catastrophic overflow of the tank 12 occurs; further, if the fluid level 40 exceeds the maximum "alarm" level due to pump failure but continued flow through the input lines 14 and/or 18, the float control 34 can be programmed to signal to automatically turn off the pumps supplying solutions through the inlet lines 14, 18.

A principal advantage of the invention, however, is that the pressurized flow of clean water into the system, via the outlet line 29, flushes drainage plumbing and keeps drains clear of deleterious residue build-up and clogging.

The invention is favorably distinguished from transfer stations that introduce fresh dilution water into the effluent tank. In the invention, dilution/flushing water is introduced outside and "downstream" of the effluent holding tank, eliminating the possibility of accidentally overflowing the tank with fresh water. The invention also is distinguished from systems employing pressure eductors to draw fluid from the tank. In some effluent transfer systems, the relative reduction in pressure (i.e. a Venturi effect) resulting from liquid flowing rapidly through the straight course of a T-fitting is used to suck fluid through the branch of the T-fitting into the liquid flow. The present invention offers improved reliability over pressure eductor-type systems.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for transferring effluent from a system, the system discharging a waste solution and a by-product solution, said apparatus comprising:

a tank comprising a sample port to permit sampling of the effluent;

an inlet for introducing the waste solution into said tank;

a canister discharge inlet for introducing the by-product solution into said tank for mixing with the waste solution, the mixture comprising an effluent, the fluid level of which rises and falls within said tank;

a pump for evacuating the effluent from said tank to a drain line;

a control switch outside said tank and in communication with said pump;

a float within said tank, floatable upon the effluent at the fluid level, in operative connection with said control switch;

said float signaling said control switch and starting said pump to begin evacuating the effluent when the fluid level rises to a first predetermined level in said tank;

said float signaling said control switch to stop said pump when the fluid level falls to a second predetermined level in said tank; and an anti-clogging system for flushing said drain line and keeping said drain line clear of residue build-up and clogging.

2. An apparatus according to claim 1 wherein said waste solution inlet is disposed in a side of said tank.

3. An apparatus according to claim 1 further comprising a conduit disposed inside said tank proximate to a bottom portion of said tank, connected to said canister discharge inlet, for introducing the by-product solution below the fluid level.

4. An apparatus according to claim 1 wherein said pump comprises at least one impeller.

5. An apparatus according to claim 1 wherein the first predetermined level is approximately at a height of said waste solution inlet.

6. An apparatus according to claim 1 wherein said float is movable up or down through a distance of between approximately 8" and approximately 10", whereby the first predetermined level and the second predetermined level are separated by approximately 9"±1".

7. An apparatus according to claim 1 further comprising:
a water feed line for supplying water to said drain line;
a water control valve, in communication with said control switch, for controlling water flow through said water feed line;
said control switch opening said water control valve to start water flow to said drain line while effluent is evacuating through said drain line; and
said control switch closing said water control valve to stop water flow to said drain line when no effluent is evacuating through said drain line.

8. An apparatus according to claim 1 further comprising a water feed line supplying water to said tank.

9. An apparatus according to claim 8 further comprising a water control valve in communication with said control switch, for controlling water flow through said water feed line;
said control switch opening said water control valve to start water flow to said drain line while effluent is evacuating through said drain line; and
said control switch closing said water control valve to stop water flow to said drain line when no effluent is evacuating through said drain line.

10. An apparatus according to claim 1 wherein said float is movably situated on a rod.

11. An apparatus according to claim 1 wherein the waste solution mixes with the canister by-product solution and wherein the waste solution buffers the canister by-product solution resulting in a mixed effluent of approximately pH 7.0 to 7.5.

12. An apparatus according to claim 1 wherein the waste solution is mixed with bleach fix to effectively neutralize acidity of mixture in said tank.

13. An apparatus according to claim 8 wherein the water is pressurized and introduced with controlled bursts for flushing said drain line and keeping said drain line clear of residue build-up and clogging.

* * * * *